June 19, 1956

S. E. BOXELL ET AL 2,750,815

BEARING RESEATING DEVICE

Filed June 9, 1952

INVENTORS.
SAMUEL E. BOXELL
WILLIAM F. RICHTER
ROBERT E. HALL
BY CLAYTON R. HALL
LEONARD R. DANE

*Edward W Long*
ATTORNEY.

INVENTORS.
SAMUEL E. BOXELL
WILLIAM F. RICHTER
ROBERT E. HALL
BY CLAYTON R. HALL
LEONARD R. DANE
ATTORNEY.

United States Patent Office 2,750,815
Patented June 19, 1956

2,750,815

BEARING RESEATING DEVICE

Samuel E. Boxell, William F. Richter, Robert E. Hall, Clayton R. Hall, and Leonard R. Dane, Clay City, Ill., assignors to The Pure Oil Company, Chicago, Ill., a corporation of Ohio Application June 9, 1952, Serial No. 292,558

1 Claim. (Cl. 77—2)

The present invention relates to a device for reseating bearing surfaces, particularly bearing surfaces which are an integral part of a rotating member of a machine, which member is ordinarily inaccessible and requires dismantling of the machine to expose the surface to an ordinary lathe cutting operation.

Although it is common practice to design and construct machines and engines so that most of the wearing parts are easily accessible and readily dismantled, such practice is not always possible or practical in the more complicated machines like internal combustion engines. Where a machine is called upon for continuous duty 24 hours a day, week in and week out, as in oil field pumping operations, the maintenance engineers cannot always be sure that each component part is free from wear or replace same before some damage has occured to other parts. In such continuous duty engines, it is paramount that the down-time for repairs be reduced to a minimum. However, certain machines or engines because of their inherent characteristics or design for their particular purpose have wearing parts located on more complicated and integral components of the machine which require dismantling the entire engine for replacement or repair of these wearing parts. Maintenance engineers are always seeking ways and means of cutting down-time and the need for completely dismantling a machine for the replacement of a worn part.

The present invention comprises a device which eliminates the necessity of dismantling a machine for the purpose of reseating, cutting, or resurfacing a rotatable wearing part. In particular, the invention relates to a cutting or reaming device which can be readily attached to an engine housing after removal of the power take-off unit, and used to cut, ream, or rebore a bearing recess in a crankshaft or other component part which is rotatable by the running of the engine. The bearing proper, being a single or double roller or ball bearing, may be held in place in the counterbore by a sleeve. When the bearing is worn, it is necessary to cut out the sleeve, which itself may be uneven or wallowed out, in order to replace the sleeve and bearing. An example of such an engine is the Cooper-Bessemer Model GSD or GSDH gas or diesel pumping engine. The two-cylinder engine has a clutch pilot bearing located in a counterbore at one end of the crankshaft, which bearing needs replacement and reseating in the course of extended use. Because of the peculiar location of the clutch pilot bearing, the crankshaft and the counterbore, it is ordinarily necessary to dismantle the entire engine, remove the crankshaft, and subject the crankshaft to a separate lathing operation to reseat this bearing. The present device allows the accomplishment of the boring or reseating operation with only minor dismantling of the power take-off unit and has the additional advantage of utilizing the power of the engine to perform the cutting operation.

It is, therefore, a primary object of this invention to provide a device designed to facilitate the reseating or reboring of a bearing surface or bearing sleeve located in a rotatable component part of an engine without the necessity of dismantling the engine and employing the motive power of the engine to perform said cutting operation on said rotatable component.

It is a second object of this invention to provide a device for reseating and reboring the clutch pilot bearing surface in the counterbore in the end of the crankshaft of a Model GSD Cooper-Bessemer engine or other engine having a similar wearing part requiring resurfacing or reseating.

It is a third object of this invention to provide a method for reseating and reboring a clutch pilot bearing surface located in the end of a rotatable power-producing component of an engine without dismantling the engine.

Reference is made to the drawings for a more detailed description of the reboring device in which.

Figure 3:
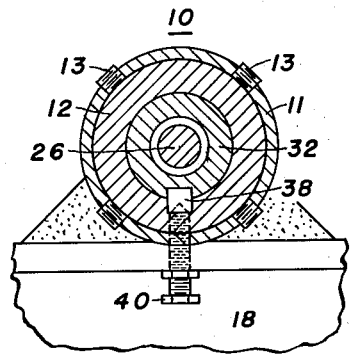
Figure 3 is a cross-sectional view of the present device taken along line 3—3 of Figure 1.
Figure 6:
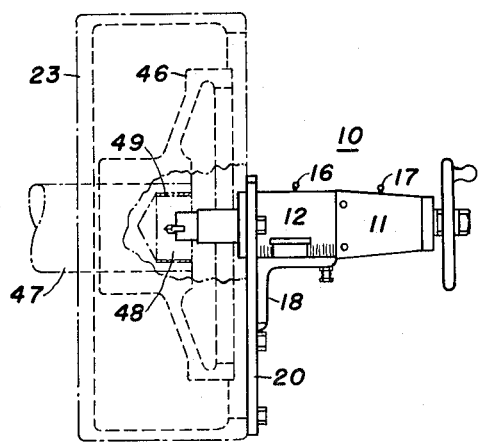
Figure 6 is a typical elevation of the boring device applied to a clutch or power take-off housing extension.
Figure 5:
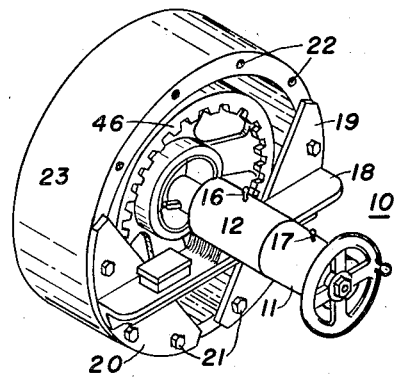
Figure 5 is an isometric view of the boring device bolted on the clutch or power take-off housing extension of an engine with cutting tool in position to start the cutting operation within the bearing recess or counterbore in the end of the crankshaft to which the clutch or power take-off is attached.

Referring to the drawings, the number 10 represents the boring unit itself with component parts and bracket for attachment and alignment when in use. The body of boring unit 10 comprises two casings 11 and 12, shown as separable parts to facilitate fabrication and maintenance of the working parts housed therein. One end of casing 11 is shown as fitting over a narrow portion of casing 12 in telescoping relationship. Set screws 13 (Figure 3) pass through casing 11 and impinge upon the narrow portion of casing 12 to form a rigid union. Casings 11 and 12 may comprise one complete housing fabricated as one piece. Openings 14 and 15 provide passages for lubricant introduced through grease fittings 16 and 17 (Figures 5 and 6). Casing 12 is welded or otherwise secured to support 18.

Plates 19 and 20 are attached to each end of support 18, thus providing a bracket arrangement to support and align the boring unit 10 in operable relationship to the wearing part to be bored. Holes or slots are tapped in the outer edges of plates 19 and 20 to allow insertion of bolts 21 into corresponding holes 22 of clutch or power take-off extension 23. Support 18 may be slidably attached to plates 19 and 20, thus allowing adjustment of the bracket arrangement to accommodate different size housings. Likewise, casing 12 may be slidably attached to support 18 with means provided, as set screws (not shown), to secure the casing at various positions to accommodate housings of different depths. By this arrangement, boring unit 10 becomes an integral part associated in either a rigid or adjustable relationship with the bracket parts 18, 19, and 20, and as such is a portable tool adapted to be readily clamped on a housing and aligned in position to perform the cutting operation. Thus, the tool may be designed in rigid configuration for use in the maintenance of machines or engines of an installation where only one size and depth of housing are encountered or may be designed to fit housings of varying size and depth.

Casing 11 is welded or otherwise secured to collar 24, into which is fitted bushing or thrust bearing 25 serving as a support and bearing for threaded shaft 26. Fitting 17 in hole 14 serves as a means of lubrication for the moving parts within casing 11. The shoulder 27 on shaft 26 prevents longitudinal movement of the threaded shaft. Shaft 26 extends beyond collar 24 to provide a place for fitting hand wheel 28 thereon, by means of washers 29 and 30 and lock nut 31. Hand wheel 28 is keyed or otherwise fastened to shaft 26 so that both the wheel and shaft become driving members upon rotation of the hand wheel.

Figure 4:
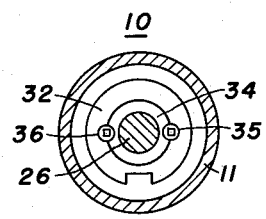
Figure 4 is a cross-sectional view taken along line 4—4 of Figure 1.

Both casing 11 and 12 are tubular in form, the former having a larger inside diameter than the latter. Spindle 32 fits within casing 12. The inside diameter and surface of casing 12 and the outside diameter and surface of spindle 32 are machined to a snug slide fit so that spindle 32 may be slidably moved longitudinally to and fro within casing 12. Spindle 32 has a recess 33, slightly larger than the outside diameter of threaded shaft 26, extending throughout a substantial portion of its length. Follower nut 34 is held in non-rotating relationship within an enlarged end portion of recess 33 by means of set screws 35 and 36 (Figure 4). The inside threads of follower nut 34 engage the threads of shaft 26, so that rotation of the driving members, hand wheel 28, and shaft 26 causes the horizontal movement of the driven member, spindle 32, through the stationary members, casings 11 and 12. Recess 33 accommodates the extending portion of shaft 26. The mechanical engagement between shaft 26 and follower nut 34 may be any form of incurved rim, helix, spiral or curved inclined plane so that the rotational movement of the shaft causes the longitudinal movement of the follower nut and spindle. A suitable cutting tool or bit 37 is mounted at the head of spindle 32. In order to prevent spindle 32 from rotating within casing 12 due to torque imparted from the cutting operation and at the same time allow horizontal movement of spindle 32, the two parts are keyed to one another by means of square or other suitable form of key 38, which extends the length of spindle 32 within appropriate key-ways in the adjacent surfaces of the spindle and casing. Set screws 39 and 40 impinge upon key 38, holding same in position so that it will not be carried by frictional contact with spindle 32, and assuring its proper alignment. Retaining washer 41 with gasket 42 serves as a lubricant seal for the head end of spindle 32 against the end of casing 12. Washer 41 is held in place by set screws (not shown) or other appropriate means.

Figure 1:
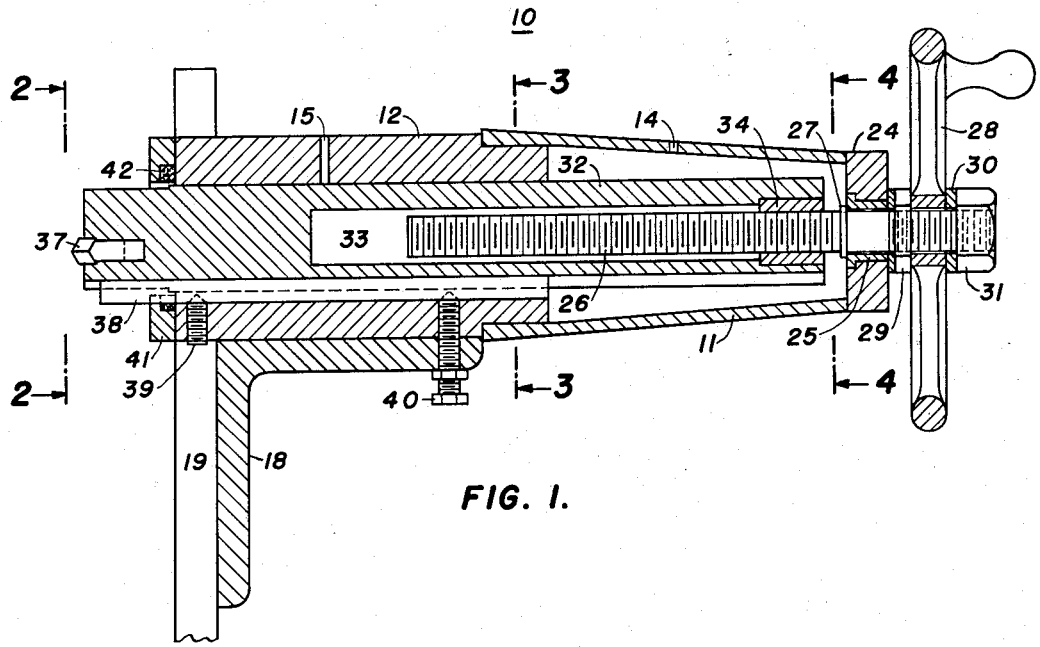
Figure 1 is a longitudinal section view of the reboring device or boring unit showing its component parts and their relation to one another.
Figure 2:
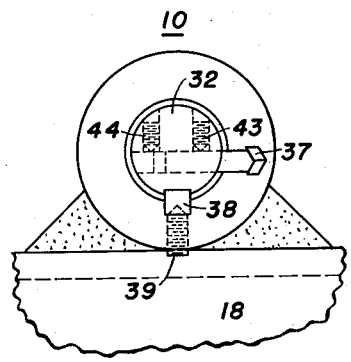
Figure 2 is an end-section view of the reboring device taken along line 2—2 of Figure 1.
Figure 7:
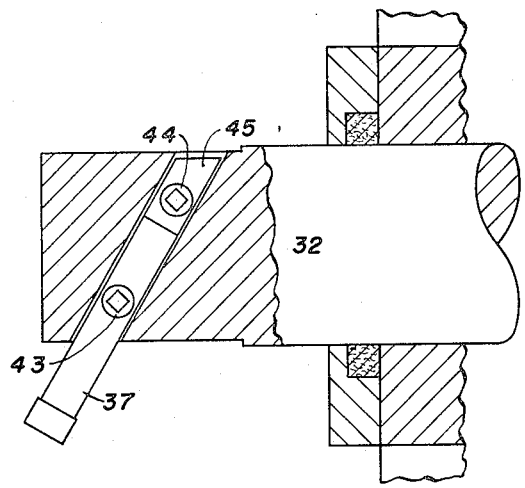
Figure 7 is a cross-sectional view of the cutting head end of the spindle (rotated through 90°) to show the means for holding the cutting tool or bit.

The cutting tool 37 is shown as having a square shank fitting within a square aperture within the head end of spindle 32. The cutting tool aperture extends at an oblique angle through the spindle body. Set screw 43 holds the cutting tool proper while set screw 44 impinges on back-up member 45 (Figures 2 and 7). The outer surface of back-up member 45 is beveled to be flush with the outer surface of spindle 32. Adjustment of the cutting tool is accomplished by loosening both set screws 43 and 44, placing the tool in the desired position, setting set screw 43 against the tool, allowing back-up member 45 to press against the end of the cutting tool and then setting set screw 44 against the back-up member.

Figures 5 and 6 show the manner in which the boring unit 10 is affixed to a housing 23 and expose the actual bearing retaining surface to be recut. Housing 23 is any typical cover means for clutch or power take-off 46, mounted on the end of crankshaft 47. In Figures 5 and 6, the power take-off unit, as for example a hand operated clutch arrangement connected to a pulley or other means for carrying the torque from the shaft 47, has been removed. This exposes bolt holes 22 to which brackets 19 and 20 are attached. Thereby cutting tool 37 is placed in juxtaposition to recess or counterbore 48, the inner circumferential surface of which is to be rebored, reamed, or otherwise resurfaced by cutting therefrom an equal amount of metal surface or bearing insert or sleeve, as represented by 49, to make way for the insertion of a new bearing sleeve or other replacement part. The power take-off unit which has been removed may be a unit as manufactured by the Twin Disc Clutch Company, it being an integral unit in itself with appropriate shaft, pulley, clutch mechanism and bearings (none of which are shown). Removal of the power takeoff unit of this type in no way interferes with the running of the engine.

After the boring unit 10 has been bolted in position on housing 23, the hand wheel 28 is turned until the cutting tool is adjacent the outer edge of recess 48. Then the cutting tool is adjusted by means of Allen screws 43 and 44 so that it contacts the inner surface of recess 48. The engine is then started and by rotation of the hand wheel 28 the cutting tool 37 is run into recess 48 of rotating crankshaft 47 and out again. Adjustment of the depth of cut is obtained by Allen screws 43 and 44. The cutting operation is repeated until any sleeve member 49 has been removed or the "wallowed out" recess also represented by 49 has been trued and resurfaced. The engine speed must be adjusted according to the cutting capabilities of the bit and the skill of the operator.

Since in one embodiment of the device the boring unit 10 may be slidably mounted to support 18, the device may be adapted for making an outside cut on the outer surface of a cylindrical rotatable part or shaft, as in a typical lathe operation and use of the device is not confined to resurfacing a counterbore as illustrated.

The invention, therefore, comprises the combination of component parts and their relationship and function with each other in the form of a maintenance tool or boring device adapted to resurface, ream, or bore any rotatable recess in a shaft or counterbore within a machine or engine or associated therewith. The invention also contemplates the method of reboring or resurfacing a worn rotatable shaft recess or component part of an engine or other machine wherein such wearing part, counterbore, or shaft recess is first exposed by removal of any protective housings or power take-off units, the device is attached and aligned in operable boring relationship to said wearing part, independent power is supplied to rotate said wearing part, shaft recess, or counterbore, and the predetermined amount of said worn surface is removed, bored, or cut therefrom. Although the invention has been described and illustrated by showing the device as designed and fabricated for use with a certain model and design of engine having the type of wearing or wallowed surface not easily accessible for maintenance purposes, it is not to be limited thereby and is to be given a scope commensurate with the appended claim.

What is claimed is:

A cutting device for resurfacing the inner circumferential surface of a counterbore in the end of a crankshaft of an engine, said counterbore supporting a clutch pilot bearing of a detachable power take-off unit, said unit being attached to an arcuate housing surrounding the counterbore end of said crankshaft, said housing having a flat peripheral surface in a plane perpendicular to the axis of rotation of said counterbore and said counterbore being inaccessible for ordinary metal cutting operations without disassembly of said engine, comprising the combination of a lathe tail stock having a housing, said housing having a longitudinal bore open at one end and closed at the other, a spindle slidably mounted in said bore and adapted to project exteriorly from the open end thereof, a cutting tool mounted on the projecting end of said spindle, a rotatable feed screw means journaled in the end of said bore and adapted to operatively engage the inner end portion of said spindle, bracket means attached to said housing to hold said tail stock and cutting tool in cutting relationship with said counterbore within said arcuate housing, said bracket means comprising an elongated supporting member extending transverse the axis of said housing and attached to the outside wall thereof adjacent the open end of said housing, terminal face plates attached to each end of said supporting member and said face plates having means to affix same flush to the flat peripheral surface of said arcute housing.

References Cited in the file of this patent

UNITED STATES PATENTS

| | | |
|---|---|---|
| 283,367 | Barclay | Aug. 21, 1883 |
| 857,931 | Frick | June 25, 1907 |
| 1,457,725 | Coats et al. | June 5, 1923 |
| 1,791,546 | Wise | Feb. 10, 1931 |
| 2,359,210 | Engel | Sept. 26, 1944 |
| 2,507,155 | Gruen et al. | May 9, 1950 |